United States Patent
Fujii et al.

(10) Patent No.: US 7,957,334 B2
(45) Date of Patent: Jun. 7, 2011

(54) COMMUNICATION SYSTEM, A REPEATER TERMINAL IN A COMMUNICATION SYSTEM AND A COMMUNICATION METHOD

(75) Inventors: Takeo Fujii, Fuchu (JP); Erina Kojima, Fuchu (JP)

(73) Assignee: The University of Electro-Communications, Tokyo (JP)

(*) Notice: Subject to any disclaimer, the term of this patent is extended or adjusted under 35 U.S.C. 154(b) by 861 days.

(21) Appl. No.: 11/886,520

(22) PCT Filed: Jan. 20, 2006

(86) PCT No.: PCT/JP2006/301272
§ 371 (c)(1),
(2), (4) Date: Oct. 29, 2007

(87) PCT Pub. No.: WO2006/098088
PCT Pub. Date: Sep. 21, 2006

(65) Prior Publication Data
US 2008/0165721 A1      Jul. 10, 2008

(30) Foreign Application Priority Data
Mar. 15, 2005   (JP) .................................. 2005-073546

(51) Int. Cl.
*H04B 7/14*    (2006.01)
*H04J 1/10*    (2006.01)
*H04J 3/08*    (2006.01)

(52) U.S. Cl. ........................ 370/315; 370/492; 370/501

(58) Field of Classification Search ........................ None
See application file for complete search history.

(56) References Cited

U.S. PATENT DOCUMENTS

| | | | | |
|---|---|---|---|---|
| 7,005,985 | B1* | 2/2006 | Steeves | 340/572.1 |
| 7,397,864 | B2* | 7/2008 | Tarokh et al. | 375/299 |
| 7,483,710 | B2* | 1/2009 | Kitazawa et al. | 455/522 |
| 7,636,301 | B2* | 12/2009 | Sipola | 370/225 |
| 2004/0160986 | A1* | 8/2004 | Perlman | 370/480 |

FOREIGN PATENT DOCUMENTS

| | | |
|---|---|---|
| JP | 2004-282268 | 10/2004 |
| JP | 2005-064963 | 3/2005 |
| WO | WO 03/032617 | 4/2003 |

OTHER PUBLICATIONS

Erina Kojima; Takeo Fujii; Yukihiro Kamiya; Yasuo Suzuki; "OFDM Ad Hoc Network no tame no STBC o Mochiita Bunsan ARQ"; IEICE Technical Report, RCS2004-76 to 86; vol 104, No. 123, Jun. 11, 2004, ISSN 0913-5685; pp. 7 to 12.

* cited by examiner

*Primary Examiner* — Chirag G Shah
*Assistant Examiner* — Ashley L Shivers
(74) *Attorney, Agent, or Firm* — Manabu Kanesaka

(57) ABSTRACT

This invention provides a communication system, a repeater terminal in the communication system and a communication method for improving the characteristics in a multi-hop communication by a diversity gain and reduces the power consumption by wasteful retransmission in packet transmission at a wireless terminal. When a transmitter terminal S sends a packet first time, repeater terminals R1-R13 perform a data transmission by retransmission at all the terminals which received the packet. When a transmitter terminal S sends a packet second time, a repeater terminal determines its own contribution based on the hop numbers of the repeating in the packet transmission and the return ACK (or NACK) repeating. The repeater terminal with a high contribution autonomously determines to be in "repeater mode" and the repeater terminal with a low contribution autonomously determines to be in "sleep mode".

7 Claims, 14 Drawing Sheets

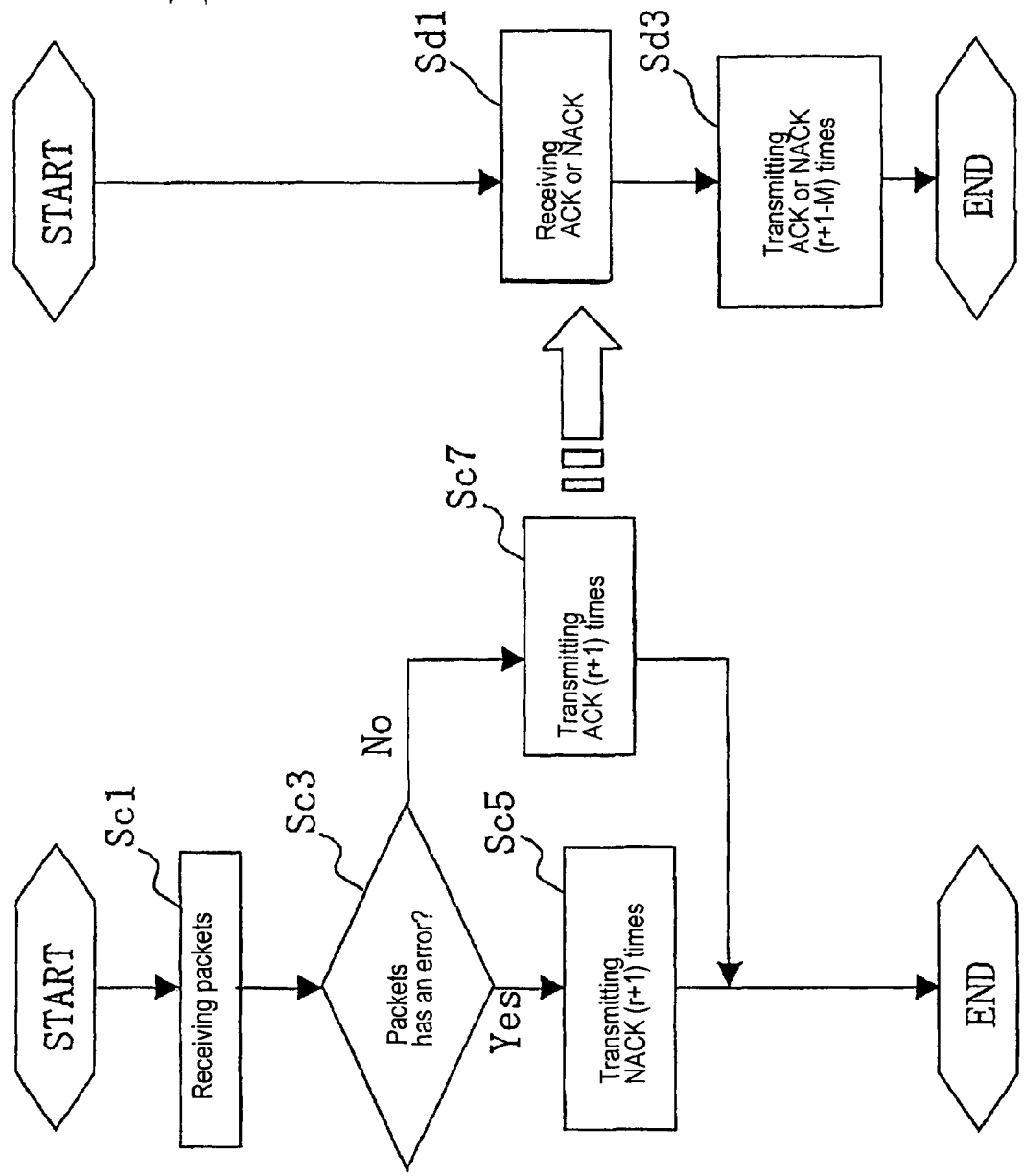

COMMUNICATION SYSTEM, A REPEATER TERMINAL IN A COMMUNICATION SYSTEM AND A COMMUNICATION METHOD

BACKGROUND OF THE INVENTION AND RELATED ART STATEMENT

This invention relates to a communication system, a repeater terminal in a communication system and a communication method for repeating communication at the repeater terminal when packet data are transmitted from the transmitter terminal to a destination terminal.

Attention has been recently focused on the ad-hoc networks in which plural wireless terminals communicate each other without relying on particular infrastructure, e.g. base stations, wired networks. In ad-hoc networks, the networks are easily and flexibly formed by using direct communication between the terminals within a common communication coverage and a multi-hop communication through a terminal for repeating the communication between the terminals that cannot communicate each other directly.

For example, Japanese laid-open patent application Tokukai No. 2003-209577 discloses an exemplary multi-hop communication technique for decreasing bit error rate and improving the communication efficiency by determining the size of transmitted packets depending on the characteristics of the communication line for transmission.

In general, it is required to implement a routing for determining the communication route by determining the terminal that the repeater terminal communicates next when a terminal (transmitter terminal) communicates with a remote destination terminal through another terminal. In an ad-hoc network using wireless, since the network information changes every second by movement of terminals, disconnection, etc., there are a lot of problems because of the complexity of the routing for an efficient communication between a transmitter terminal and a destination terminal.

In view of this situation, a technique for realizing a communication without routing in an ad-hoc network using wireless is proposed by sending ARQ (Automatic Repeat request) from the destination terminal to the transmitter terminal, and in response to the ARQ and simultaneously retransmitting from the transmitter terminal and the repeater terminals when an error occurred at the destination terminal.

For example, Japanese laid-open patent application Tokuhyo No. 2001-518725 discloses an exemplary technique relating to ARQ for combining the original signal that was retransmitted by ARQ with the obtained various kinds of information at the time when the signal was failed to receive.

In a circumstance requiring a multi-hop communication, a packet error occurs and the characteristics are significantly degraded if a normal multi-hop communication is implemented when the distance between the transmitter terminal and the destination terminal is large or when the power level drops due to a fading.

One of the techniques for improving the above mentioned degraded characteristics is known as an antenna diversity technique for transmitting packets using plural antennas. As one of the transmitter antenna diversity techniques, STBC (Space-Time Block Code) is known. This is a technique for obtaining a diversity gain on the receiver side by simultaneously sending the differently coded packets from the plural transmitter antennas individually. FIG. 7(A) shows an exemplary configuration of a STBC communication system using two transmitter antennas.

In FIG. 7 (A), the complex number signals (symbols) S0, S1, . . . are sent to a transmitter terminal 72 having STBC function from an information source 71. At the transmission terminal 72, a first STBC transmitting pattern (pattern 1: S0, pattern 2:−S1) and a second STBC transmitting pattern (pattern 1:−S1*, pattern 2: S0*) shown in FIG. 7(B) are generated from the consecutive two symbols S0, S1, and an antenna 731 transmits the pattern 1 signals S0, S1* and an antenna 732 transmits the pattern 2 signals S1, S0*. At a receiver terminal 74, a diversity gain which is equivalent to the Maximum Ratio Combination (MRC) can be obtained by performing a weighted combination as shown in FIG. 7 (A).

It is difficult to prepare plural antennas at one terminal to obtain a diversity gain in an ad-hoc network because miniaturization of terminals is required. A technique for obtaining a diversity gain is a STBC by utilizing terminals distributed in the surround area (distributed terminals) and simultaneously transmitting packets from the terminals. Each terminal is used as an antenna diversity branch. See, for example, Erina Kojima, Takeo Fujii, Yukihiro Kamiya, Yasuo Suzuki "Distributed ARQ using STBC for OFDM ad-hoc network", Shingakugihou, June 2004, RCS2004-77, pp. 7-12. STBC has the advantage that the transmitter side needs no channel information and no phase sharing is required between the terminals when the distributed terminals transmit the signals. FIG. 8 shows a STBC model by plural terminals.

FIG. 9 shows a schematic view of signal transmission and reception by distributed terminal ARQ for an ad-hoc network using STBC, and FIG. 10 shows an exemplary signal transmission timing chart.

As a communication method, OFDM (Orthogonal Frequency Division Multiplexing) is used to reduce the effect of timing errors by GI (Guard Interval) considering the timing offset between terminals at the time of ARQ retransmission. FIG. 11 shows the operation of a transmission terminal S and a repeater terminal Rn (n=1, 2, 3, . . . ) at the time of packet transmission. When the transmission terminal S transmits packets to the destination terminal D (Step Sa1), the repeater terminal Rn that is in a waiting status (step Sb1) receives the packets (Step Sb3) and performs a provisional demodulation (Step Sb5).

When the demodulation was completed without errors ("Yes" at Step Sb7), the repeater terminal R waits for a packet retransmission (Step Sb9). When the demodulation has error ("No" at Step Sb7), the process returns to the reception waiting status at Step Sb1.

When the packet retransmission waiting time reaches a predetermined time ("No" at Step Sb11), the process ends. The transmitter terminal S determines whether it received ACK (Acknowledgement) from the receiver terminal D within a predetermined time ("No" at Step Sa3), the transmitter terminals S transmits a retransmission control signal (Step Sa7) when the number of packet transmission times is less than the predetermined number of retransmission times ("Yes" at Step Sa5).

The number of the transmitted retransmission control signals is set to identical to the number of packet retransmission times (r times). For example, if it is the second packet retransmission, two retransmission control signals are transmitted.

When it exceeds the predetermined retransmission times ("No" at Step Sa5), the packets are destructed and the process ends. The retransmission control signal includes the address of the transmitter terminal S, the address of the destination terminal D, the packet ID, the retransmission timing bit, the number of transmission times, maximum retransmission times, etc. Assuming that the retransmission control signal which is first received by the repeater terminal Rn is the N times transmission from the transmitter terminal S, when the present number of packet retransmission times is r ("Yes" at Step Sb13), the repeater terminal Rn checks the information included in the transmitted retransmission control signal, and updates the information for the number of transmission times that was saved in the repeater terminal Rn (Step Sb15). When the retransmission control signal includes the packet ID receives at Step Sb3 and maintained at the repeater terminal Rn, the repeater terminal Rn synchronizes the retransmission timing and transmits (r−N) times the control signal from the transmitter terminal S to the destination terminal D or another repeater terminal Rm (n≠m, m=1, 2, 3 . . . ) (Step Sb17).

Both the transmitter terminal S and the repeater terminal Rn which received the packets from the transmitter terminal S at Step Sb3 transmit the retransmitted packets to the destination terminal D or another repeater terminal Rm simultaneously (Steps Sa9, Sb19).

At this time, the transmitter terminal S and the repeater terminal R send two transmission patterns of STBC by selecting autonomously.

The repeater terminal Rm or the destination terminal D which received retransmitted packets from both the transmitter terminal S and the repeater terminal Rn using STBC separates the channel estimate values by the pattern of STBC, and performs a weighted combination and demodulation.

The transmitter terminal S returns to the operation at Step Sa3 and the repeater terminal Rn returns to the operation at Step Sb9.

FIG. 12 shows the operation of the destination terminal D and the repeater terminal Rm at the time of ACK transmission. The destination terminal D receives the packets (Step Sc1), and transmits a NACK to the transmitter terminal (Step Sc5) when the packets have an error ("Yes" at Step Sc3), the destination terminal D transmits a ACK to the transmitter terminal S (Step Sc7).

The repeating of the ACK and NACK is performed in the opposite way of the repeating of the control signal.

When the packets arrived at the destination terminal D by at the r th time retransmission the destination terminal D transmits (r+1) times ACK or NACK.

The repeater terminal Rm which received ACK or NACK at the M th time transmission (Step Sd1), the repeater terminal Rm repeats ACK or NACK to the transmitter terminal S by transmitting (r+1−M) times (Step Sd3).

Further objects and advantages of the invention will be apparent from the following description of the invention.

SUMMARY OF THE INVENTION

The packet success rate is improved by performing ARQ at the plural terminals using a STBC in comparison with repeating by an OFDM only because a diversity gain is obtained. The more number of times repeating is performed the better the packet success rate is obtained, and a high quality communication can be realized without routing.

However an ARQ at the plural terminals using STBC causes wasteful power consumption by using the terminals that do not work for repeating to the destination terminal because the terminals transmit the signals in all directions during repeating the retransmission.

The present invention was made in view of the aforementioned points, and the purpose of the invention is to provide a communication system, a repeater terminal in the communication system and a communication methods for improving the characteristics by a diversity gain of a multi-hop communication in packet transmission at a wireless terminal and reduce the wasteful power consumption by the repeating.

A communication system according to the present invention is characterized by the following (1) to (5).

(1) A communication system for transmitting packet data from a transmitter terminal to a destination terminal by repeating at least one repeater terminal, comprising a first transmitting means for transmitting the packet data from the transmitter terminal toward the destination terminal;

a receiving means for receiving a response signal that is for the packet data transmitted by the first transmitting means and is transmitted from the destination terminal;

a second transmitting means for transmitting a control signal including information for the transmitter terminal and the destination terminal and information for the packet data depending on presence or absence and the type of the response signal;

the first transmitting means further includes a means for repeating the packet data after sending the control signal from the second transmitting means;

the destination terminal includes a third transmitting means for sending a response signal to the transmitter terminal in response to the packet data transmitted from the first transmitting means, the repeater terminal includes, a first repeating means for receiving the packet data and sending the packet data to the destination terminal or another repeater terminal;

a second repeating means for sending the response signal received by the receiving means to the transmitter terminal or another repeater terminal;

a determining means for determining the contribution of the repeater terminal numerically based on the number of repeating times of the packet data repeated by the first repeating means and the number of repeating times of the response signal repeated by the second repeating means, the repeater terminal enters in a repeating mode for continuously sending the packet data when the determining means determines that the contribution is high, or the numeric value for the contribution reaches a predetermined threshold or higher, the repeater terminal enters in a sleep mode for repeating no packet data when the determining means determines that the contribution is low, or the numeric value for the contribution does not reach a predetermined threshold or higher.

(2) A communication system according to (1), wherein the repeating mode and the sleep mode are determined by the determining means whenever the packet data are sent from the transmitter terminal.

(3) A communication system according to (1), wherein STBC encoding is performed using the packet data retransmitted by the first transmitting means and the packet data transmitted by the first repeating means, and the packet data are transmitted.

(4) A communication system according to (1), wherein the repeater terminal includes a memory means for store the packet data with an error which was generated during the reception at the first repeater means; and a combining means for combining the packet data retransmitted from the transmitter terminal by the first transmitting means with the packet data having the error stored in the memory means, and STBC encoding is performed using the packet data further retransmitted from the first transmitting means by the first transmitting means and the packet data combined using the combining means transmitted by the repeater terminal.

(5) A communication system according to (1), wherein the type of the response signal from the destination terminal is ACK signal when the packet data are received without error and the type is NACK signal when the packet data are received with error, and the second transmitting means sends the control signal when no control signal is received from the destination signal or the type of the control signal is NACK signal.

A repeater terminal system according to the present invention is characterized by the following (6) to (8).

(6) A repeater terminal for repeating packet data which is sent from a transmitter terminal to a destination terminal, comprising a first repeating means for receiving the packet data sent from the transmitter terminal and sending the packet data to the destination terminal or another repeater terminal;

a second repeating means for receiving a response signal sent from the destination terminal and sending the response signal to the transmitter terminal or another repeater terminal;

a determining means for determining the contribution of the repeater terminal numerically based on the number of the repeating times of the packet data repeated by the first repeater means and the number of the repeating times of the response signal repeated by the second repeater, the repeater terminal enters in a repeating mode for continuously sending the packet data when the determining means determines that the contribution is high, or the numeric value for the contribution reaches a predetermined threshold or higher, the repeater terminal enters in a sleep mode for repeating no packet data when the determining means determines that the contribution is low, or the numeric value for the contribution does not reach a predetermined threshold or higher.

(7) A repeater terminal according to (6), wherein the repeating mode and the sleep mode are determined by the determining means whenever the packet data are sent from the transmitter terminal.

(8) A repeater terminal according to (6), including a memory means for store the packet data with an error which was generated during the reception at the first repeater means; and a combining means for combining the packet data transmitted from the transmitter terminal by the first transmitting means with the packet data having the error stored in the memory means.

A communication method according to the present invention is characterized by the following (9).

(9) A communication method for transmitting packet data from a transmitter terminal to a destination terminal by repeating at least one repeater terminal, comprising the steps of transmitting the packet data from the transmitter terminal toward the destination terminal;

receiving a response signal that is for the packet data transmitted at the transmitter terminal;

transmitting a control signal including information for the transmitter terminal and the destination terminal and information for the packet data depending on presence or absence and the type of the response signal;

retransmitting the packet data which was sent after sending the control signal;

sending a response signal for the sent packet data toward the transmitter terminal from the destination terminal;

receiving the packet data at the repeater terminal and sending the packet data to the destination terminal or another repeater terminal from the repeater terminal;

receiving the response signal at the repeater terminal and sending the response signal to the transmitter terminal or another repeater terminal from the repeater terminal;

determining the contribution of the repeater terminal numerically based on the number of repeating times of the packet data and the number of repeating times of the response signal;

entering in a repeating mode for continuously sending the packet data when the determining means determines that the contribution is high, or the numeric value for the contribution reaches a predetermined threshold or higher;

entering in a sleep mode for repeating no packet data when the determining means determines that the contribution is low, or the numeric value for the contribution does not reach a predetermined threshold or higher.

BRIEF DESCRIPTION OF THE DRAWINGS

FIG. 12 shows a flow chart showing the operation of the destination terminal D and the repeater terminal at the time of ACK transmission when a conventional packet transmission is performed.

DETAILED DESCRIPTION OF PREFERRED EMBODIMENTS

Figure 1:
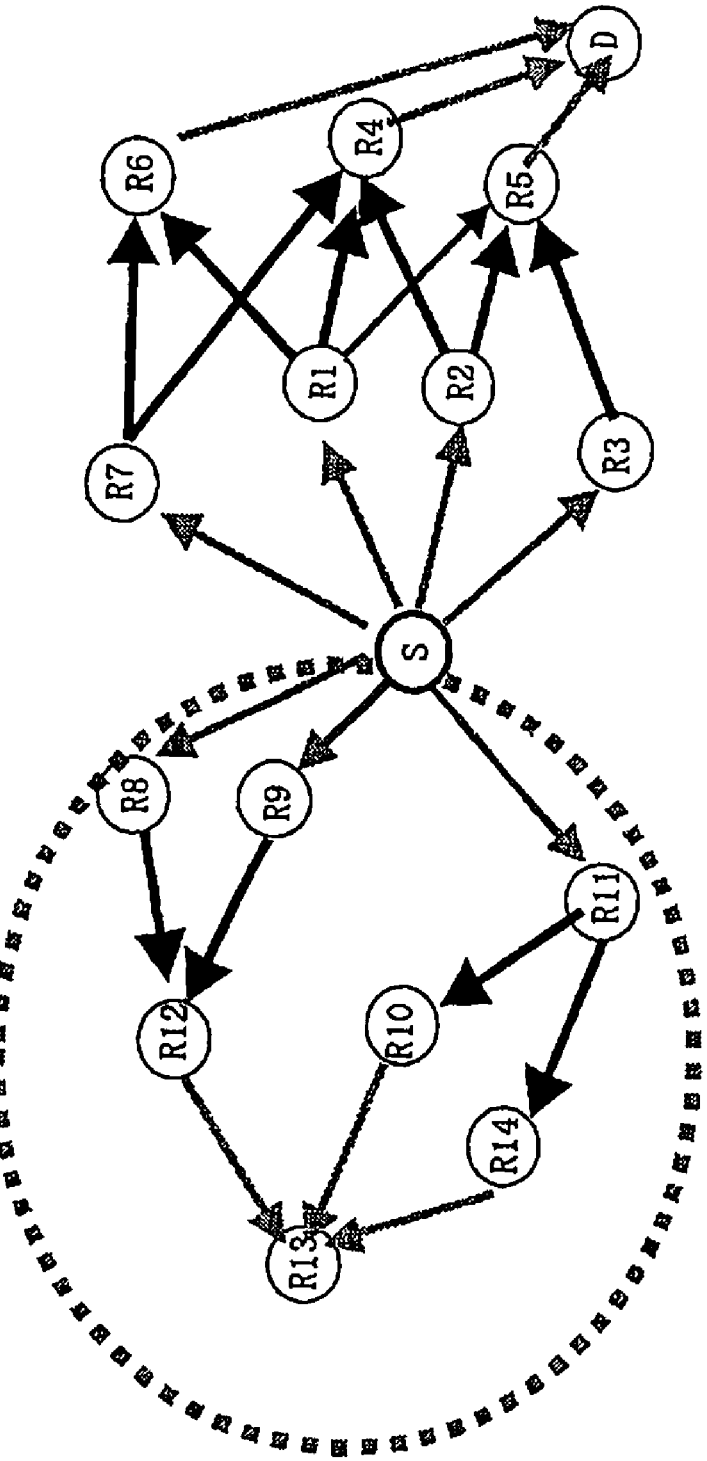
FIG. 1 shows the transmitting and receiving between the transmitter terminal S, the repeater terminals R1-R13 and the destination terminal D according to one embodiment of the present invention.

In the communication according to the present invention ((1) to (5) in the above), as the contribution by a repeater terminal is determined based on the number of repeating times of the packet data sent by the transmitter terminal and the number of repeating times of the response signal sent by the destination terminal, the repeater terminal can autonomously determine its own contribution when repeating of the packet data is performed.

According to the invention described in (1), since the repeater terminals with high contributions repeat the packet data and the repeater terminals with low contributions do not repeat the packet data, the wasteful power consumption relating to the transmission at the terminals can be reduced.

According to the invention descried in (2), a repeater terminal in sleep mode can repeat the packet data when it enters in the repeating mode by the determining means.

According to the invention descried in (3), a diversity gain can be obtained and the characteristics of the packet data can be improved by performing STBC encoding.

According to the invention descried in (4), the characteristics of the packet data in the first link can be improved and the total quality of the packet data can be improved because the packet data having an error are stored and combined with the next retransmitted packet data.

According to the invention descried in (5), the destination terminal can receive the packet data with certainty, because the transmitter terminal sends a control signal when the destination terminal did not receive the packet data without errors.

According to the repeater terminal descried in (6)-(8), the repeater terminal can determine its own contribution for the packet data repeating autonomously, because the contribution of the repeater terminal is determined based on the number of repeating times of the repeated packet data and the number of repeating times of the response signal.

According to the repeater terminal descried in (6), since the repeater terminals having high contributions repeat the packet data and the repeater terminals having the low contribution do not repeat the packet data, the wasteful power consumption elating to the transmission from the transmitter terminal to the destination terminal can be reduced.

The repeater terminal according to (7) can repeat the packet data by entering in the repeating mode from the sleep mode based on the determination.

The repeater terminal according to (8) stores the packet data having an error and combines them with the packet data retransmitted next from the transmitter terminal, therefore the characteristics of the packet data in the first link can be improved and the quality of the total packet data can be improved.

According to the communication method described in (9), the repeater terminal can determine its own contribution for the packet data repeating autonomously by determining the contribution of the repeater terminal based on the number of repeating times of the repeated packet data and the number of repeating times of the response signal.

One embodiment of the invention will be explained below referring to the drawings.

FIG. 1 shows the transmitting and receiving between the transmitter terminal S, the repeater terminals R1-R13 and the destination terminal D according to one embodiment of the present invention. The repeater terminals R1-R7 are located in the direction of the transmission from the transmitter terminal S to the destination terminal D, and the repeater terminals R8-R13 are located in the direction of the transmission from the destination terminal D to the transmitter terminal S.

Figure 2:
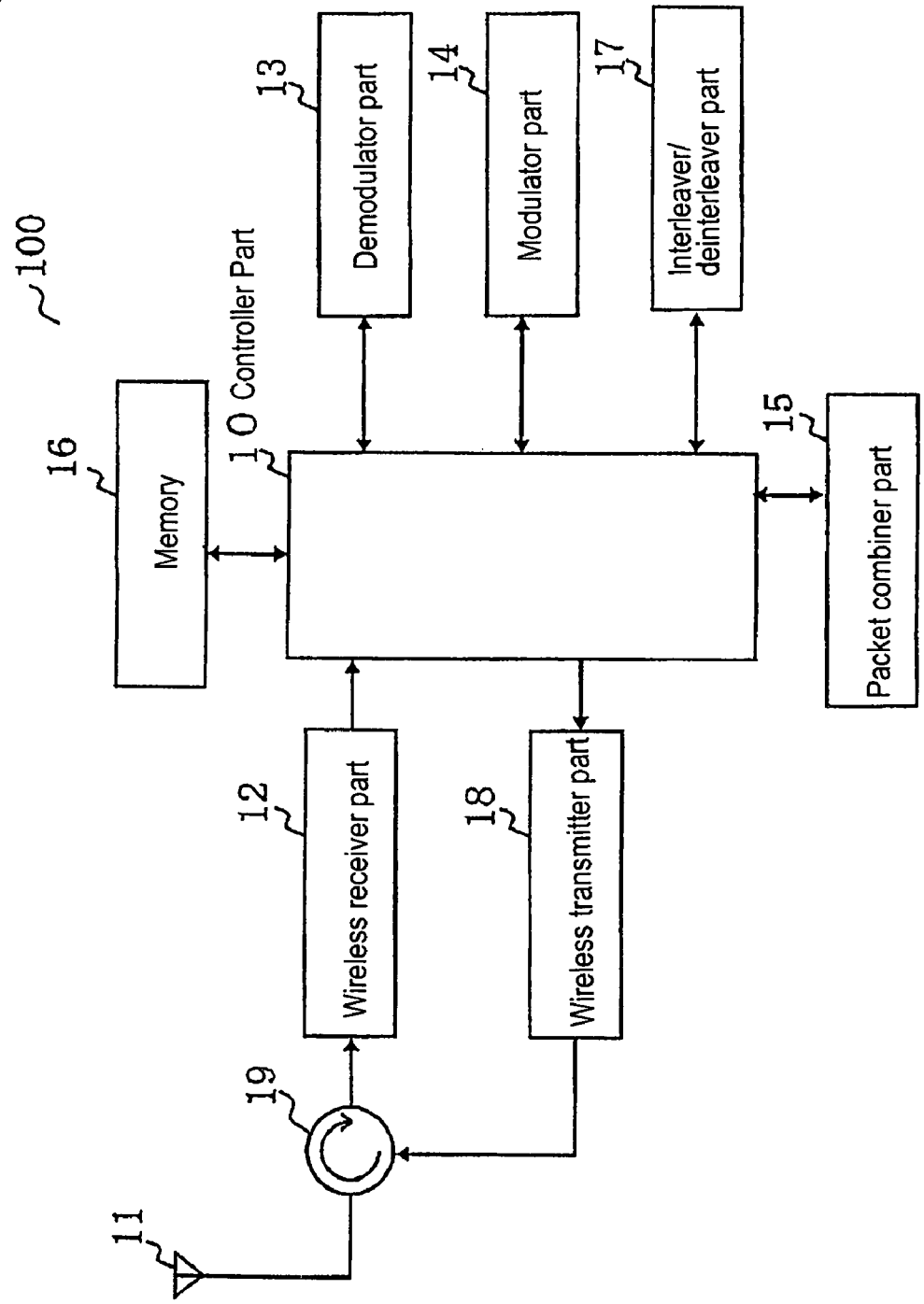
FIG. 2 is a block diagram showing a schematic configuration of each terminal shown in FIG. 1.

FIG. 2 shows a schematic view of the transmitter terminal S, the destination terminal D and the repeater terminals R1-R13. First, the configuration of the repeater terminals R1-R13 will be explained. The signal X for the packets received at the transmitting/receiving antenna 11 is input to the wireless receiver part 12 via the circulator 19. The wireless receiver part 12 down-converts and A/D/converts the input signal X to the digital signal Y, and outputs it to the controller part 10.

The controller part 10 inputs the digital signal Y to the demodulator part 13, and the signal is demodulated after the demodulation of STBC when the signal is STBC encoded. Next, the controller part 10 de-interleaves the signal at the interleaver/de-interleaver part 17. This corresponds to the carrier shift in case of multi-carrier communication.

The controller part 10 calls up the previously received signal Z which is stored in the memory 16, and combines the signal Y with the signal Z at the packet combiner part 15 and a detection is performed.

The controller part 10 determines whether the combined signal has an error. If the signal has an error, the controller part 10 stores the pre-detection signal in the memory 16 and waits for next signal arrival again.

If the signal has no error, the controller part 10 inputs the detected combined signal into the modulator part 14 and a modulation is performed. The controller part 10 performs a STBC encoding on the combined signal modulated at the modulator part 14 and outputs to the wireless transmitter part 18. The wireless transmitter part 18 applies D/A conversion to the combined signal and converts the digital signal to the analog signal, and up-converts it according to the wireless frequency. And, the signal is transmitted from the transmitting/receiving antenna 11 via the circular 19.

In the transmitter terminal S, the transmitted signal is generated in the controller part 10. The interleaver/de-interleaver part 17 performs interleaving. In the destination terminal D no signal is sent to the wireless transmission part.

Figure 10:
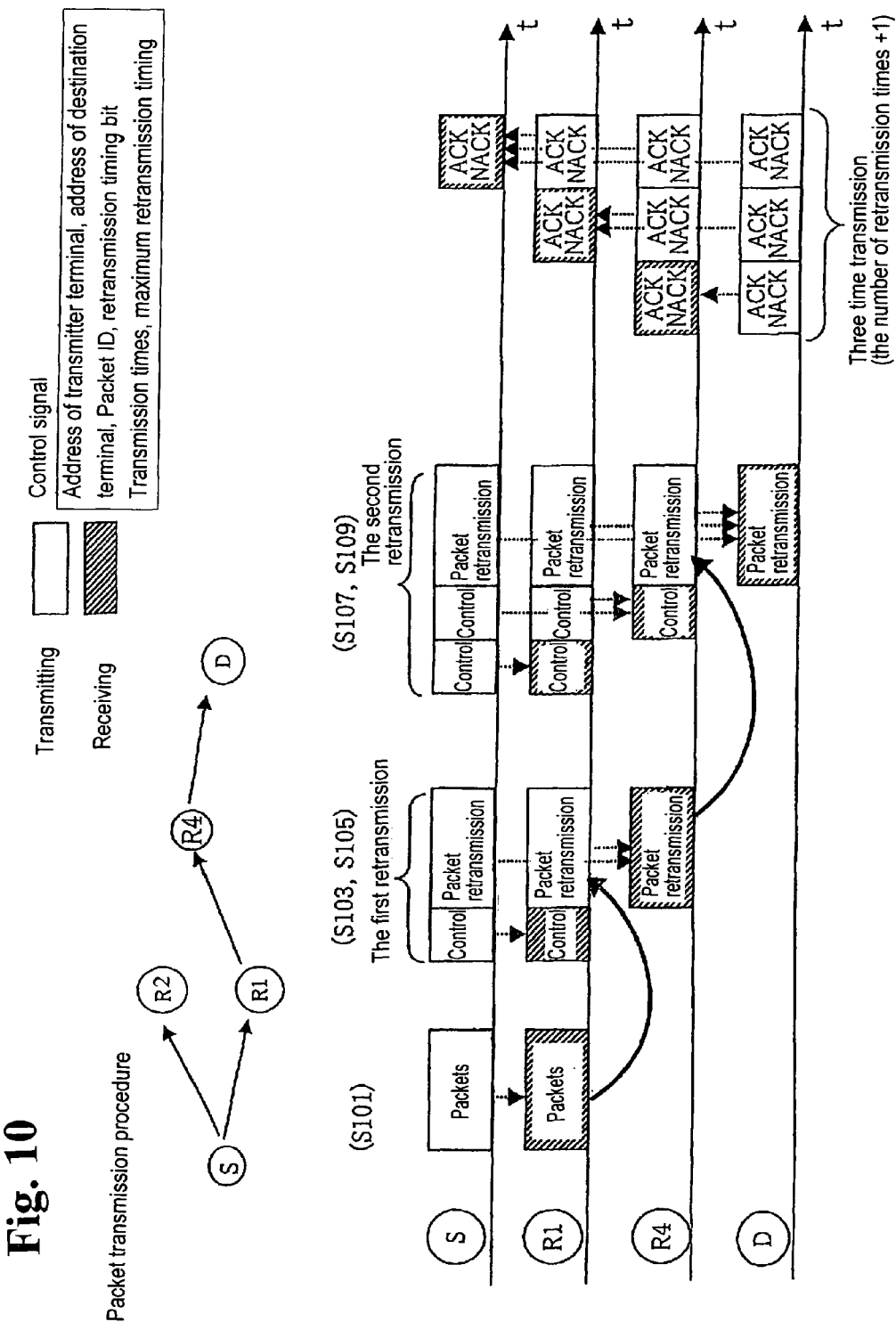
FIG. 10 shows a timing chart for the signal transmission of the terminal distributed ARQ using STBC for an ad-hoc network.
Figures 1, 11:
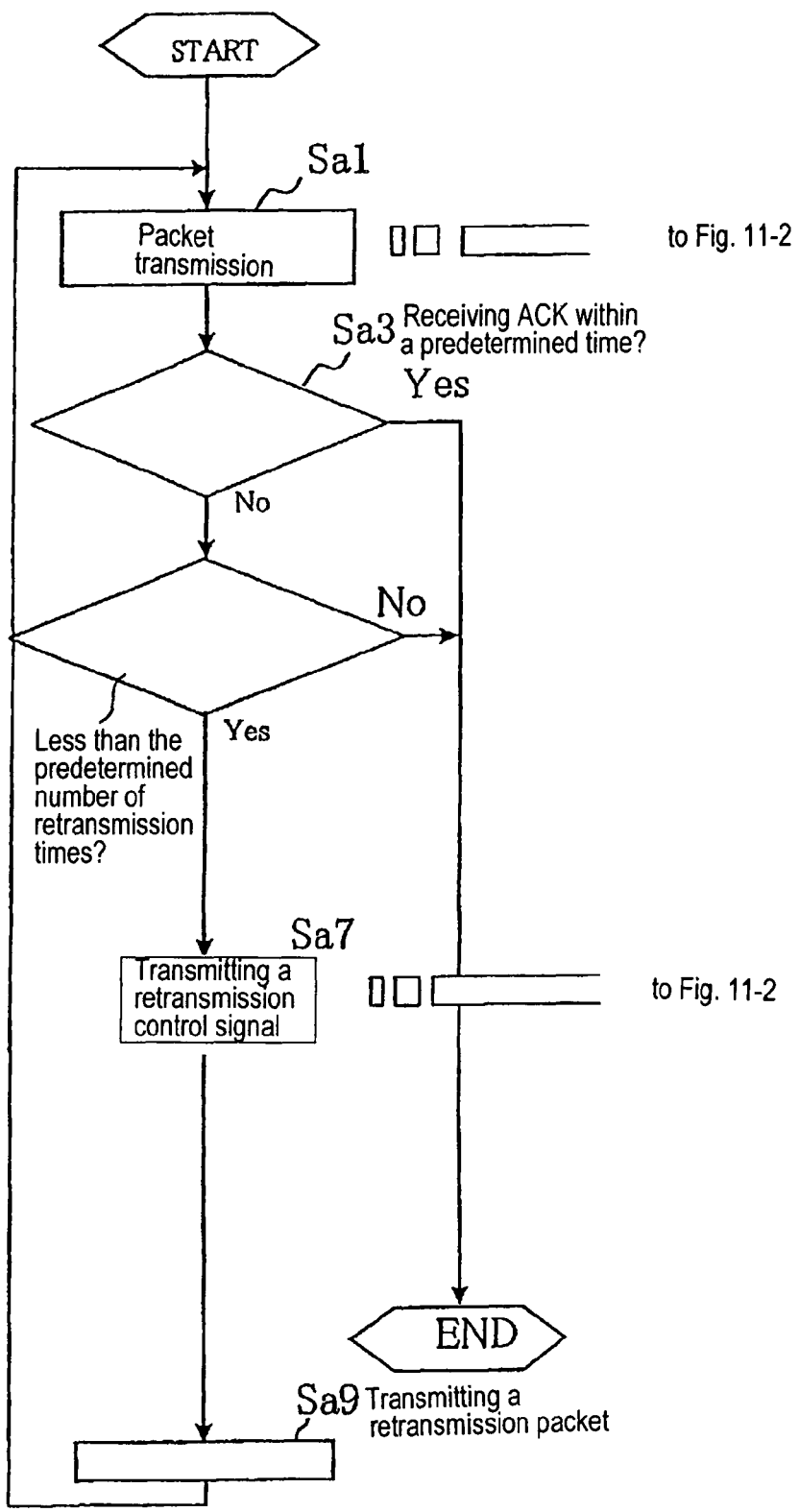
FIG. 11 shows a flow chart showing the operation of the transmitter terminal S and the repeater terminal when a conventional packet transmission is performed.
Figures 2, 11:
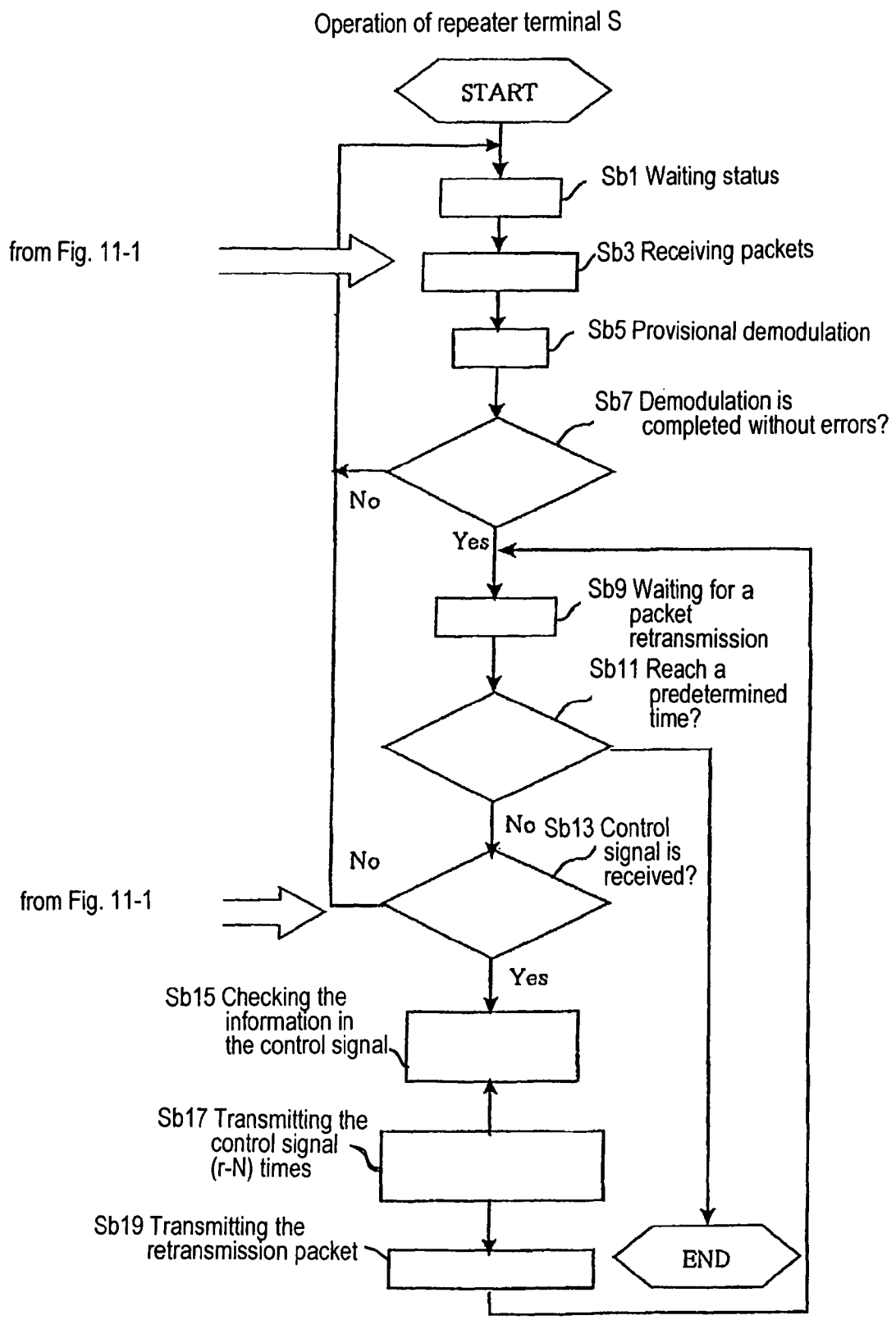
Figure 13:
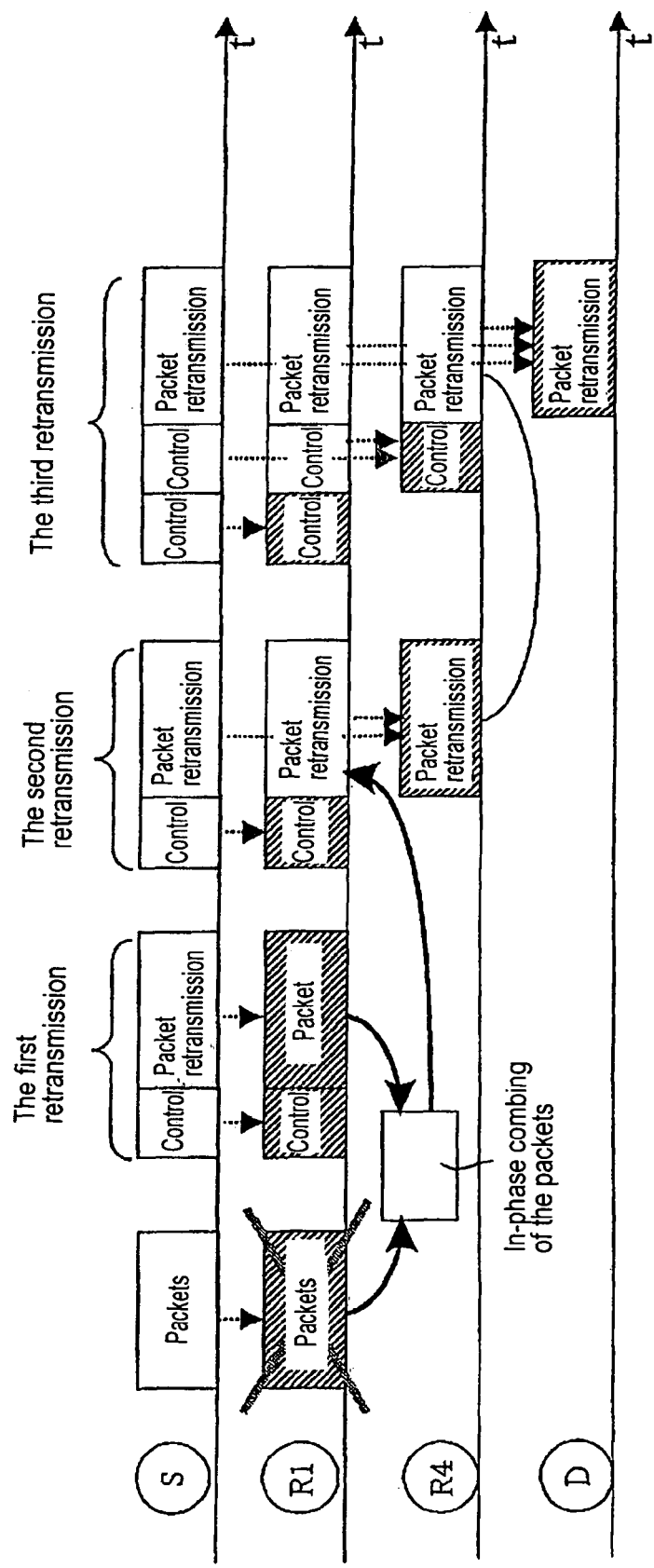
FIG. 13 shows a timing chart for the signal transmission when an in-phase combining of the packets is performed.

When the transmitter terminal S transmits the packets the first time, the repeater terminal R1-13 perform data transmission by transmission at all the terminals which received the packet as the prior art technique shown in FIG. 10 does.

When the transmitter terminal S transmits the packets the second time or later, the repeater terminal R1-13 determines their own contributions from the hop number of the repeating for the packet transmission and the return ACK (or NACK) repeating.

The repeater terminal with a high contribution enters in the "repeating mode" and the repeater terminal with a low contribution enters in the "sleep mode" by the autonomous determination.

The conditions for determining the contribution of terminals are typically described as follows.

Determining condition 1: the repeater terminal is receiving ACK.

Determining condition 2: when the number of packet transmitting times at the repeater terminal is $ST_{DATA}$, the number of ACK transmitting times at the repeater terminal is $ST_{ACK}$, and the total hop number is $TT_{HOP}$, $$TT_{HOP}-1 \leq ST_{DATA}+ST_{ACK} \leq TT_{HOP} \pm 1 \quad (1)$$

Under the determining condition 1, it can be determined whether the repeater terminal which is subject of determination is located in the transmission direction from the transmitter terminal S to the destination terminal D. Under the determining condition 2, it is possible to avoid the second time or later time retransmission to the repeater terminal on the route a long way round from the transmitter terminal S to the destination terminal D. The "total hop number ±1" in the determining condition 2 is based on the consideration of the reliability by the deference in the data length between the transmitted packets and ACK. As another example, the determining condition 2 is discussed as follows.

Determining condition 2:

$$TT_{HOP}-a1 \leq ST_{DATA}+ST_{ACK} \leq TT_{HOP}+a2 \quad (2)$$

Where a1 is "0" or a positive integer, a2 is a positive integer. It makes no difference whether a 10 a2 or a 1=a2.

If the values for a1, a2 are set to too small numbers, the number of repeating times may increase because the terminal with a relatively high condition enters in the sleep mode. If the values for a1, a2 are set to too big numbers, the power consumption increases.

The repeater terminal which satisfies the determining condition 1 and/or the determining condition 2 is determined to have a high contribution and transmits data in the repeating mode.

On the contrary, the repeater terminal which does not satisfy the determining condition 1 and/or the determining condition 2 is determined to have a low contribution and halts the data transmission in the sleep mode.

The contribution is usually defined considering the determining condition 1 and the determining condition 2. There are various ways for defining the contribution. The contribution can be described as a function F(b, a1, a2) or a function F(b, a), where a=a1=a2, and the contribution is described by setting b=1 when the determining condition 1 is satisfied and setting b=0 when the determining condition 1 is not satisfied.

The attribute of packets, e.g. the packet data length, can be added to the parameters of the function F. The contribution is a degree what extent the repeater terminal operates as an optimum repeating path for repeating of the transmitted data.

Figure 3:
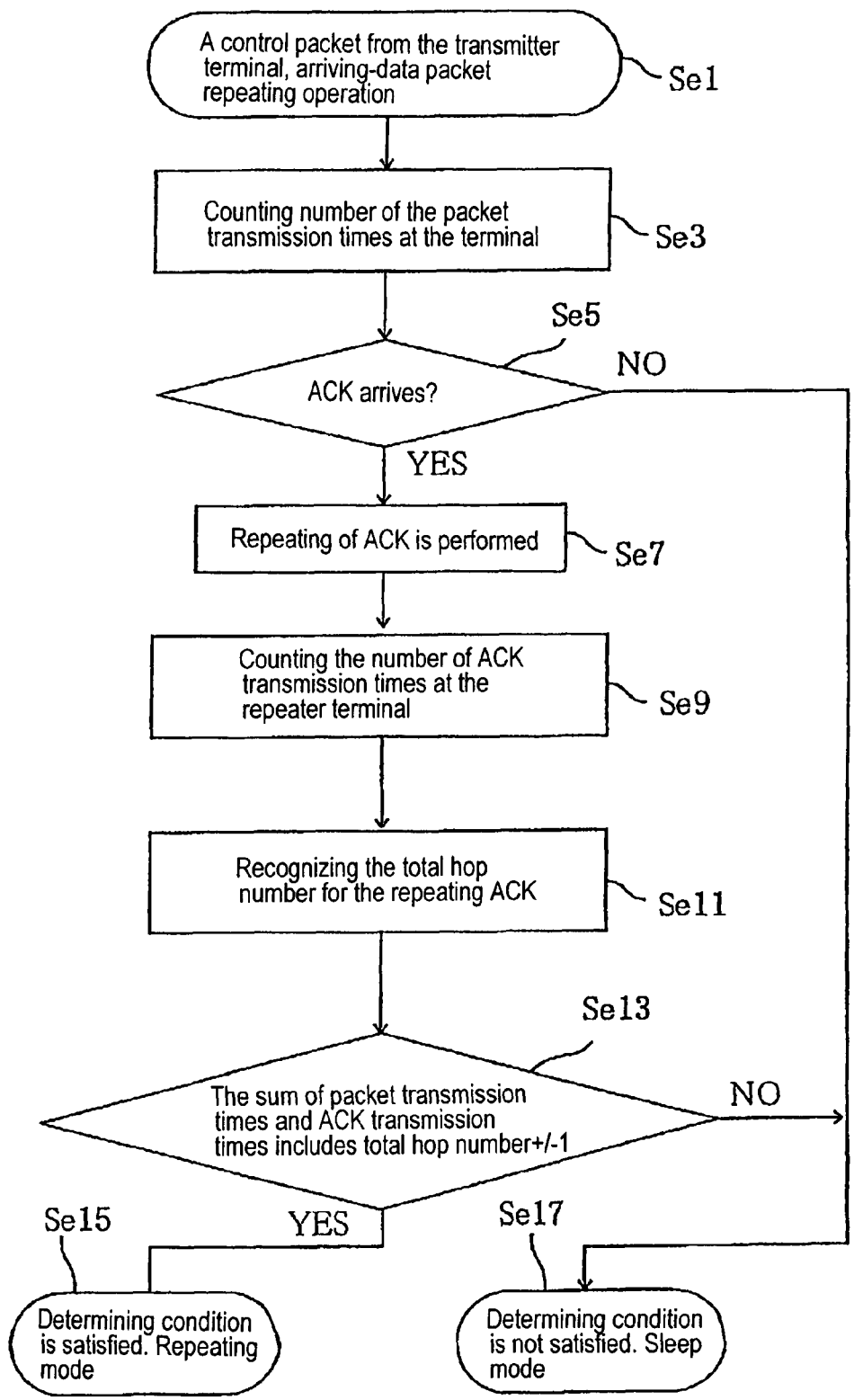
FIG. 3 is a flow chart showing an exemplary determination of the terminal contribution when a distributed ARQ is applied (the determining condition 2: the total hop number ±1).

FIG. 3 is a flow chart showing an exemplary self determination of the terminal contribution when a distributed ARQ is applied (the determining condition 2: the total hop number ±1).

First, a control packet from the transmitter terminal arrives at the repeater terminal, and the data packet repeating operating is performed (Step Se1). The number of the packet transmission times at the terminal is counted (Step Se3). The repeater terminal remains in the sleep mode or enters in the sleep mode from the repeating mode when the times for packet transmission waiting elapsed the predetermined time without receiving ACK and then the process ends because this case does not satisfy the determining condition (Step Se17).

In Step Se3, when ACK arrives, the repeating of ACK is performed (Step Se7), and the number of ACK transmission times at the repeater terminal is counted (Step Se9).

The total hop number which is included in ACK and needed for the repeating is recognized (Step Se11), and it is determined whether "$ST_{DATA}$ (the number of packet transmission times)"+"$ST_{ACK}$ (the number of ACK transmission times)" is "$TT_{HOP}$ (total hop number)" or "$TT_{HOP}$(total hop number) ±1" (Step Se13).

In Step Se13, if $ST_{DATA}$+$ST_{ACK}$ is $TT_{HOP}$ or $TT_{HOP}$±1 ("Yes" at Step Se13), the determining condition 1 and the determining condition 2 are satisfied, and it remains in the repeating mode or enters in the repeating mode from the sleep mode (Step Se15). In Step Se13, if $ST_{DATA}$+$ST_{ACK}$ is neither $TT_{HOP}$ nor $TT_{HOP}$±1 ("No" at Step Se13), the determining condition 1 and the determining condition 2 are not satisfied, and therefore it remains in the sleep mode or it enters in the sleep mode from the repeating mode (Step Se17).

Figure 4:
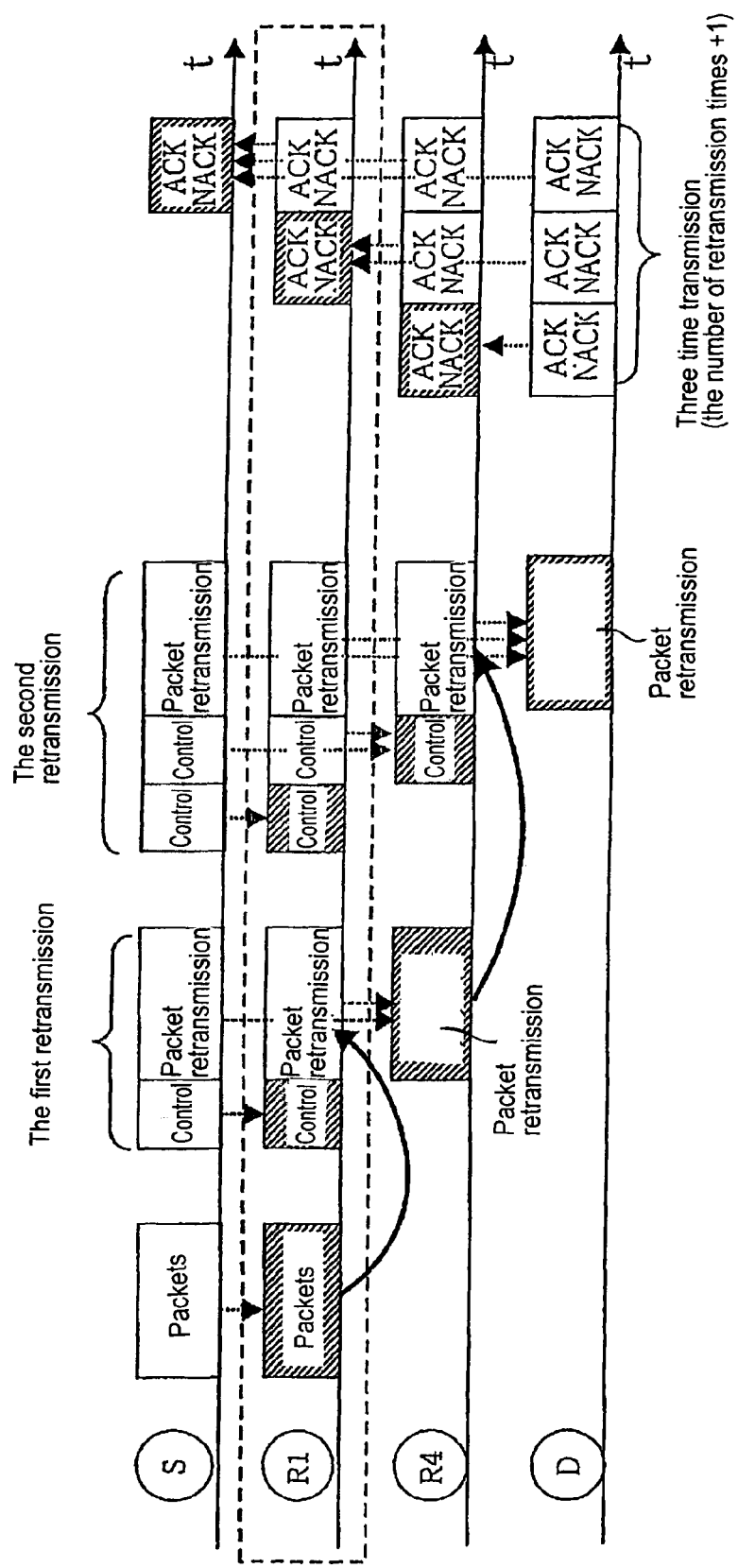
FIG. 4 shows a timing chart of the signal transmission for the repeater terminal R1 in FIG. 1.

FIG. 4 shows a timing chart of the signal transmission for the repeater terminal R1 in FIG. 1.

In FIG. 4, the repeater terminal R1 receives packets from the transmitter terminal S, and sends the packets to the destination terminal D via the repeater terminal R4.

For the repeating of the packet transmission form the transmitter terminal S, the total hop number is 3 hops, and the number of transmission times at the repeater terminal R1 is 2. On the other hand, for the repeating of the ACK (or NACK) from the destination terminal D, the total hop number is 3 hops, and the number of ACK transmission times at the repeater terminal R1 is 1.

Therefore, the repeater terminal R1 satisfies the determining condition 1 because it receives ACK, and also satisfies the determining condition 2 because the sum of the number of packet transmission times and the number of ACK transmission times is 3 and it is equal to the total number of 3, and the contribution F is determined to be high and the status of the repeater terminal R1 is the repeating mode.

Figure 5:
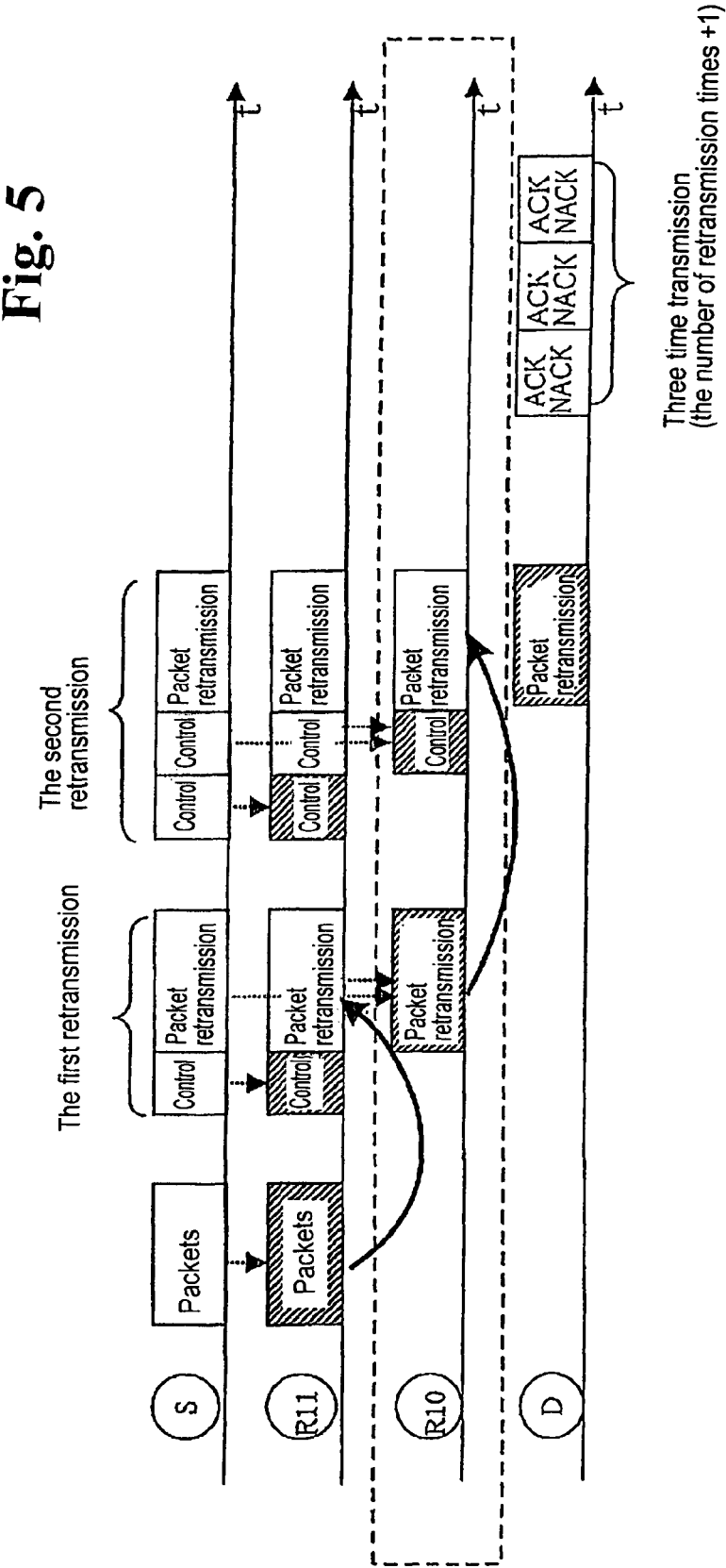
FIG. 5 shows a timing chart of the signal transmission for the repeater terminal R10 in FIG. 1.

FIG. 5 shows a timing chart of the signal transmission for the repeater terminal R10 in FIG. 1.

In FIG. 5, the repeater terminal R10 receives packets from the transmitter terminal S via the repeater terminal R11. However the repeater terminal R10 is on the opposite side of the transmitter terminal S from the destination terminal D, and therefore packets cannot directly transmitted from the repeater terminal R10 to the destination terminal D.

In FIG. 5, for the repeating of packet transmission from the transmitter S, the total hop number is 3 hops, and the number of transmission times at the repeater terminal R10 is 1. On the other hand, for the repeating of ACK (or NACK) transmission from the destination terminal D, the total hop number is 3 hops, and the number of ACK transmission times at the repeater terminal R10 is 0. Therefore, the repeater terminal R10 satisfies neither of the determining conditions 1 and 2, and the contribution F of the repeater terminal R10 is determined to below, and the status of the repeater terminal R10 is the sleep mode.

Figure 6:
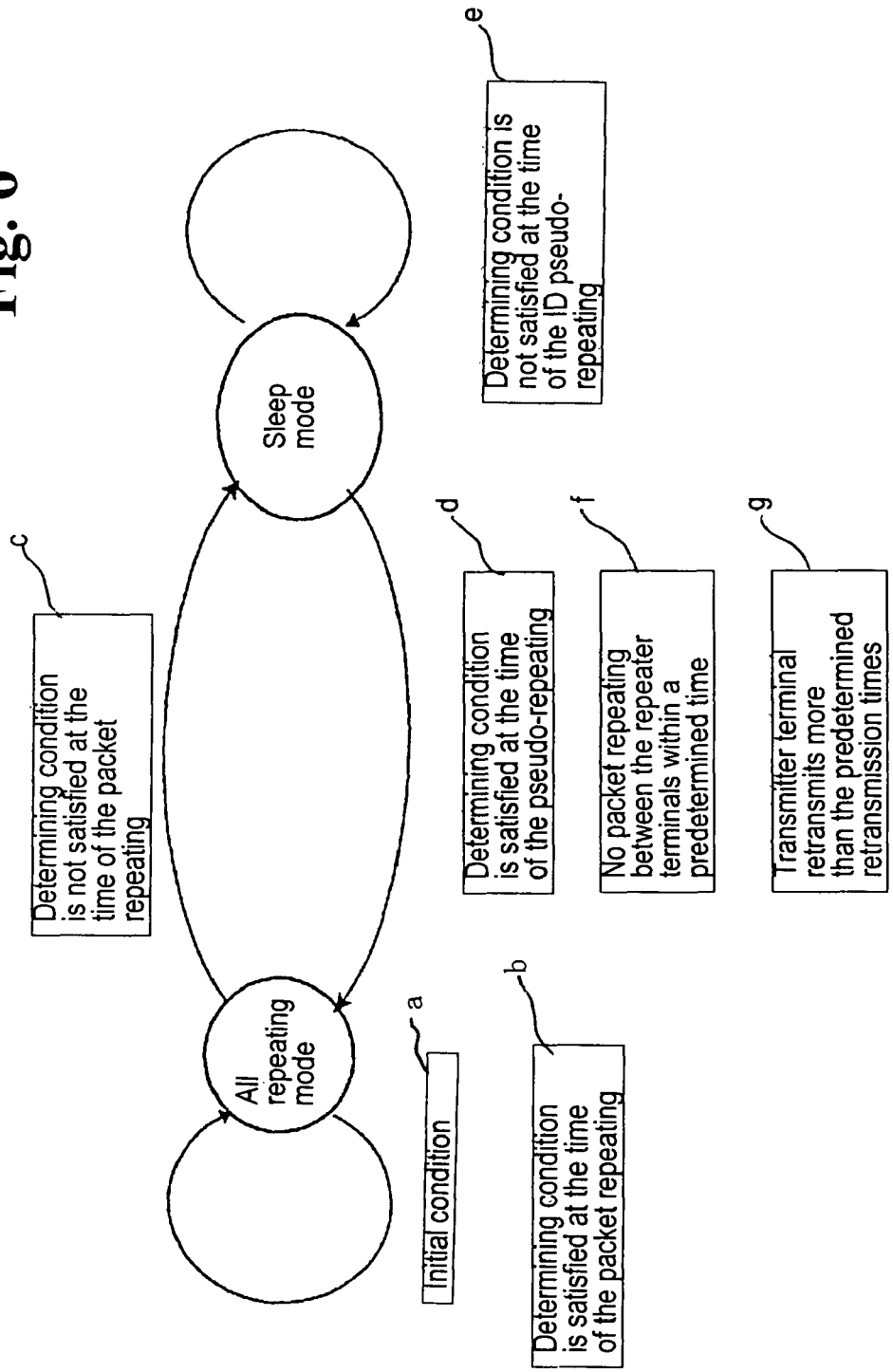
FIG. 6 shows the mode switching of the repeater terminal in FIG. 1.
Figures 7A, 7B:
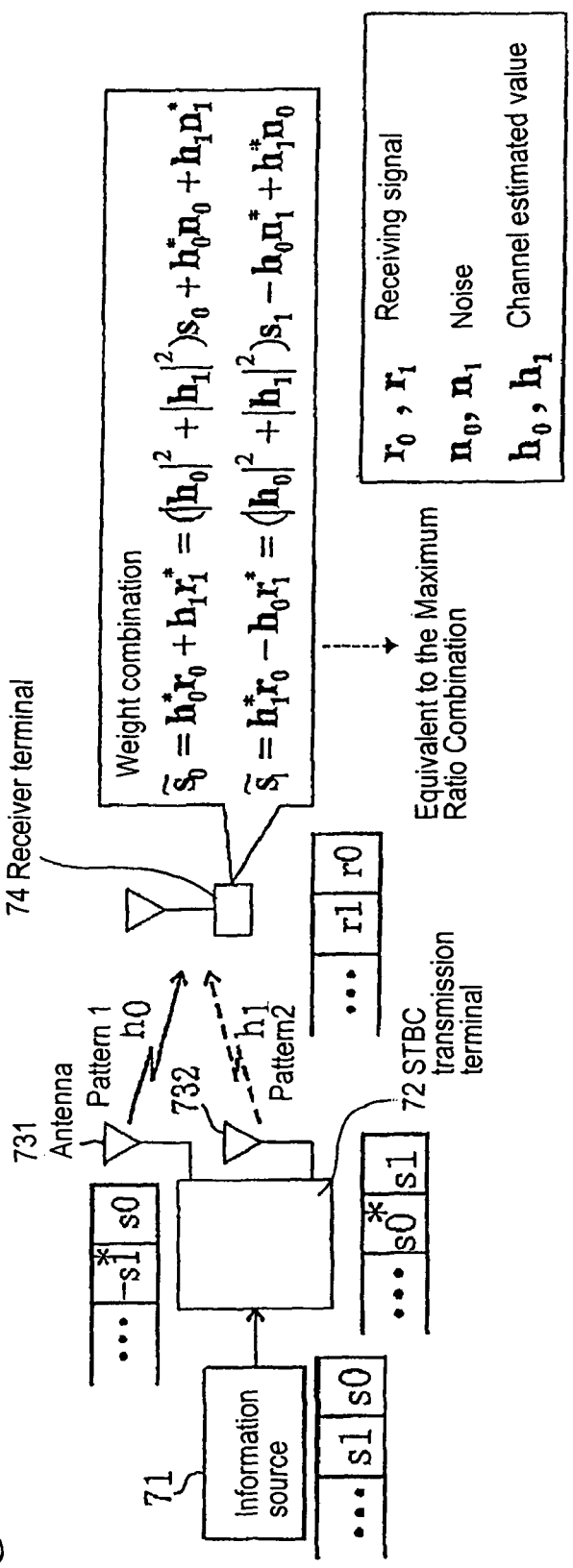
FIG. 7 shows an exemplary configuration of STBC using two transmitter terminals.
Figure 8:
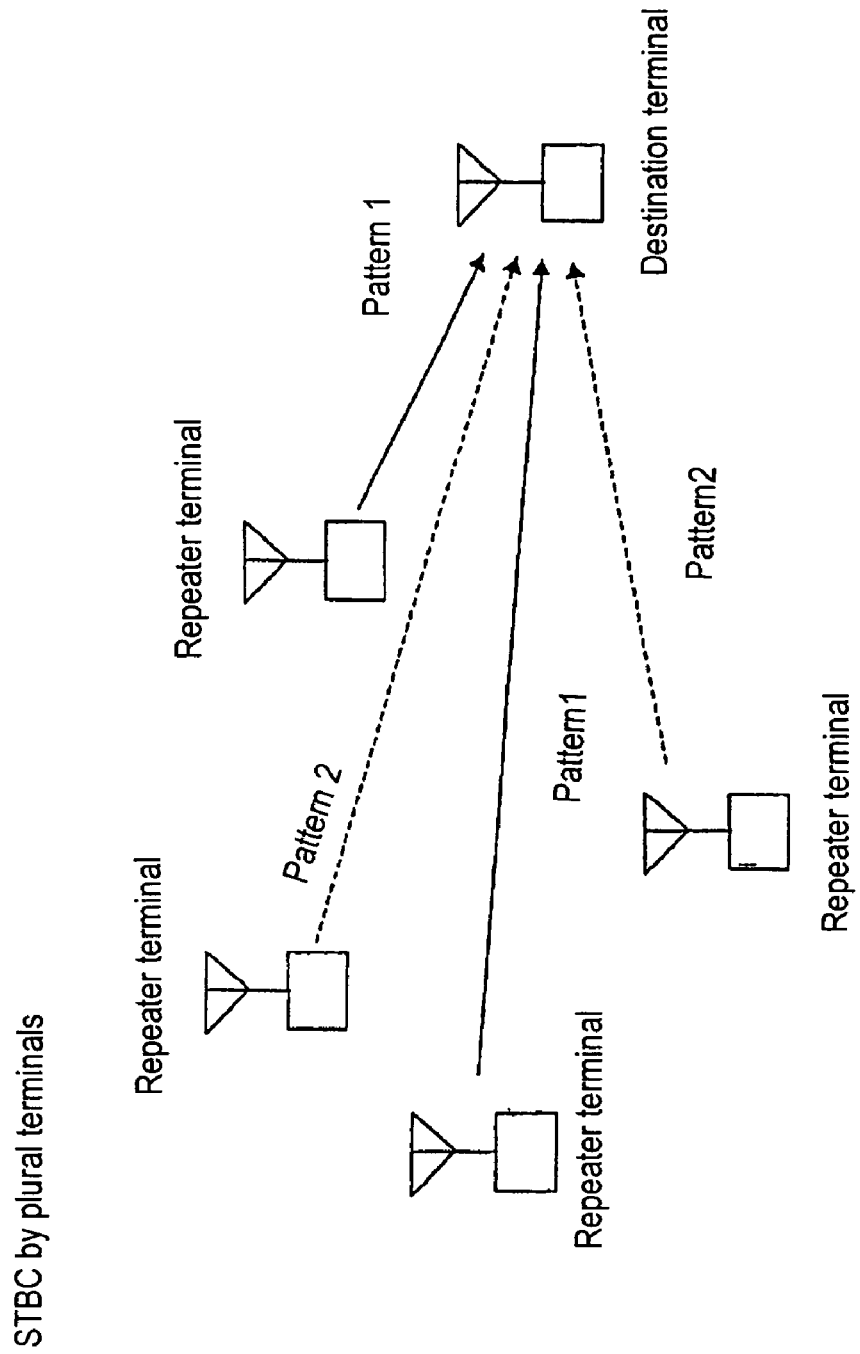
FIG. 8 shows an exemplary configuration of STBC by plural terminals.
Figure 9:
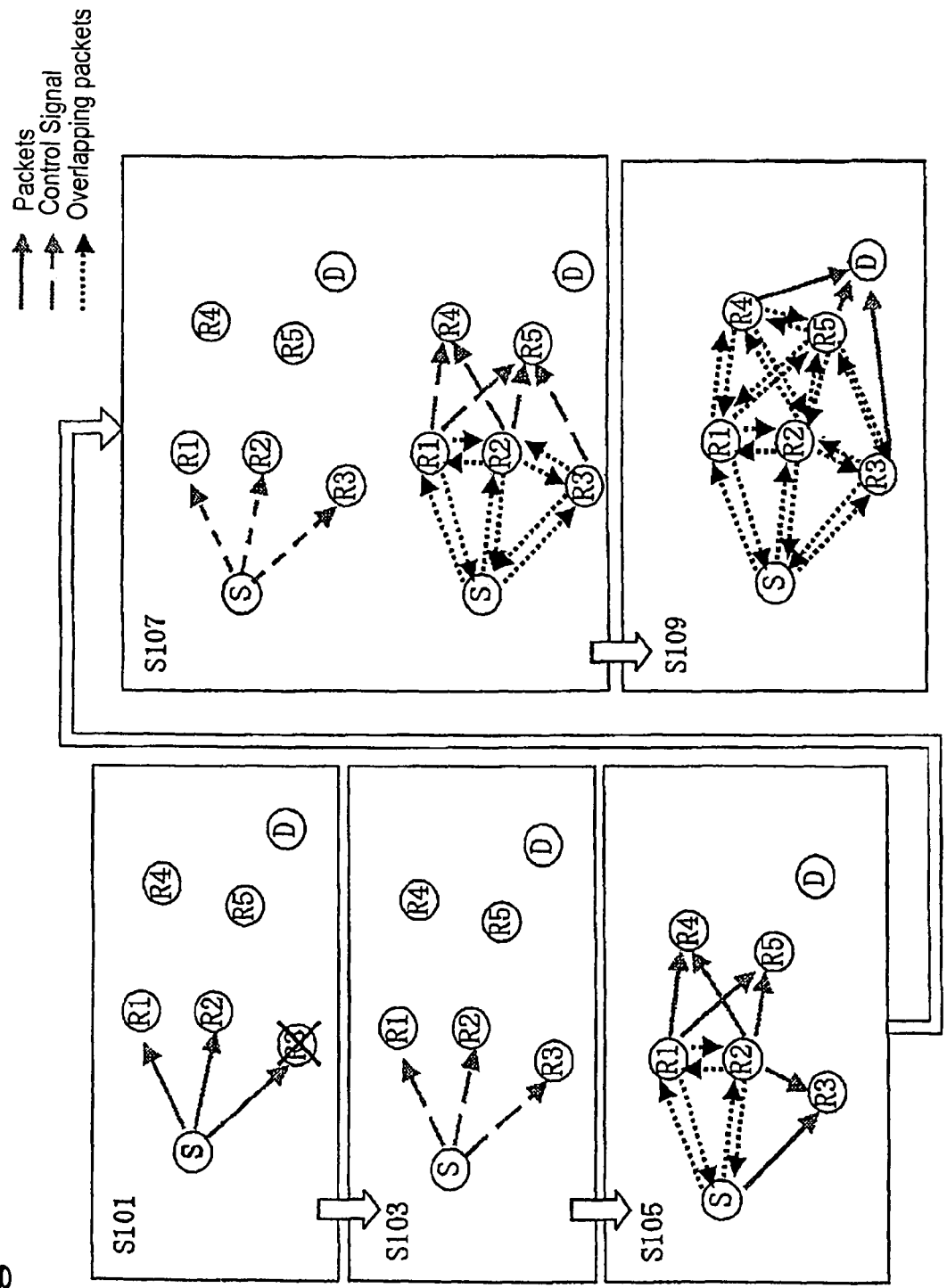
FIG. 9 shows a schematic transmitting and receiving of the terminal distributed ARQ using STBC for an ad-hoc network.

FIG. 6 shows the mode switching of the repeater terminal in FIG. 1. At the initial condition (a), all the repeater terminals are in the repeating mode. When the packet repeating from the transmitter terminal S to the destination terminal D is performed, the repeater terminal (b) which satisfied the determining conditions 1 and 2 maintains the repeating mode. When the packet repeating from the transmitter terminal S is performed, the repeater terminal (c) which does not satisfy the determining conditions 1 and 2 enters in the sleep mode.

The repeater terminal in the sleep mode receives packets ad simulates the repeating process (pseudo-repeating), however does not perform packet/ACK repeating, and disposed the received packets after a predetermined time.

The repeating terminal (d) in the sleep mode which satisfies the determining conditions 1 and 2 during the time of the pseudo-repeating enters into the repeating mode from the sleep mode. The repeating terminal (e) which does not satisfy the determining conditions 1 and 2 during the pseudo-repeating remains in the sleep mode.

If the packet repeating was continuously unsuccessful and no transmission between the repeater terminals within a predetermined time was achieved (f), or if the transmitter terminal S retransmits more than the predetermined retransmission times (g), the repeater terminal in the sleep mode enters in the repeating mode.

As described in the above, according to the embodiment, the repeater terminal determines its own contribution F base on the packet repeating and the ACK repeating, and autonomously determines whether it should be in the repeating mode or the sleep mode. The repeater terminal which is not efficient to repeat packets because it is not in the transmission direction from the transmitter terminal S to the destination terminal D can be in the sleep mode, and it can avoid wasteful packet transmission.

When the repeater terminal moved to outside the transmission direction, the adequate response can be taken by shifting the modes.

One embodiment of the present invention was described referring to the drawings, however the implementation is not limited to this embodiment and any change within the substance of the present invention is included in the scope of the invention.

For example, according to the above mentioned embodiment, since the first one hop sent from the transmitter terminal S to the repeater terminal is a single route, the characteristics improvement effect which is equivalent to the diversity gain which can be obtained in other hops cannot be obtained.

Therefore, if an error occurred when the repeater terminal receives packets in the first one hop, the received signal having an error is saved and is in-phase combined with the packet in the next first retransmission. In an alternative configuration, both the repeater terminals and the transmitter terminal S send simultaneously the retransmitted packet to the destination terminal D or other repeater terminals, and a diversity gain is obtained even in the first one hop. FIG. 3 shows the signal transmission timing chart in this case. In the second hop or later hops, by storing the previous signal when an error occurs in the packet reception and combining the result of STBC decoding together with it at the time of next retransmission, a diversity gain with the stored signal can be obtained in addition to the STBC diversity gain.

While the invention has been explained with reference to the specific embodiments of the invention, the explanation is illustrative and the invention is limited only by the appended claims.

What is claimed is:

1. A communication system for transmitting packet data from a transmitter terminal to a destination terminal through at least one of a plurality of repeater terminals, comprising:
    a first transmitting means for transmitting the packet data from the transmitter terminal toward the destination terminal;
    a receiving means for receiving a response signal that is for the packet data transmitted by the first transmitting means and is transmitted from the destination terminal; and
    a second transmitting means for transmitting a control signal including information for the transmitter terminal and the destination terminal and information for the packet data depending on presence or absence and type of the response signal;
    wherein the first transmitting means further includes a means for repeating the packet data after sending the control signal from the second transmitting means;
    the destination terminal includes a third transmitting means for sending a response signal to the transmitter terminal in response to the packet data transmitted from the first transmitting means;
    the plurality of repeater terminals each comprises:
    a first repeating means for receiving the packet data and sending the packet data to the destination terminal or one or more of the plurality of repeater terminals, and
    a second repeating means for sending the response signal received by the receiving means to the transmitter terminal or one or more of the plurality of repeater terminals, and
    a determining means for determining its contribution numerically based on a number of repeating times of the packet data repeated by the respective first repeating means and number of repeating times of the response signal repeated by the respective second repeating means;
    each of the plurality of repeater terminals enters into a repeating mode for continuously sending the packet data when the determining means determines that the respective contribution is high, or a numeric value for the contribution reaches a predetermined threshold or higher; and
    each of the repeater terminals enters into a sleep mode for repeating no packet data when the determining means determines that the respective contribution is low, or the numeric value for the contribution does not reach a predetermined threshold or higher.

2. A communication system according to claim 1, wherein STBC encoding is performed using the packet data retransmitted by the first transmitting means and the packet data transmitted by the first repeating means, and
    the packet data are transmitted.

3. A communication system according to claim 1, wherein each of the plurality of repeater terminals comprises:
    a memory means for storing the packet data with an error which was generated during the reception at the first repeater means; and
    a combining means for combining the packet data retransmitted from the transmitter terminal by the first transmitting means with the packet data having the error stored in the memory means, STBC encoding being performed using the packet data further retransmitted from the first transmitting means by the first transmitting means and the packet data combined using the combining means being transmitted by the repeater terminal.

4. A communication system according to claim 1, wherein a type of the response signal from the destination terminal is an ACK signal when the packet data are received without error and the type is a NACK signal when the packet data are received with error, and the second transmitting means sends the control signal when no control signal is received from the destination signal or the type of the control signal is a NACK signal.

5. A repeater terminal for repeating packet data which is sent from a transmitter terminal to a destination terminal, comprising:
    a first repeating means for receiving the packet data sent from the transmitter terminal and sending the packet data to the destination terminal or another repeater terminal of a plurality of repeater terminals;
    a second repeating means for receiving a response signal sent from the destination terminal and sending the response signal to the transmitter terminal or another repeater terminal; and
    a determining means for determining its contribution numerically based on a number times the packet data is repeated by the first repeating means and number of times the response signal is repeated by the second repeating means,
    wherein each of the repeater terminals enters into a repeating mode for continuously sending the packet data when the determining means determines that the contribution is high, or a numeric value for the contribution reaches a predetermined threshold or higher, and
    each of the plurality of repeater terminals enters into a sleep mode for repeating no packet data when the determining means determines that the contribution is low, or the numeric value for the contribution does not reach a predetermined threshold or higher.

6. A repeater terminal according to claim 5, wherein the repeating mode and the sleep mode are determined by the determining means whenever the packet data are sent from the transmitter terminal.

7. A communication method for transmitting packet data from a transmitter terminal to a destination terminal by repetition using a plurality of repeater terminals, comprising the steps of:
    transmitting the packet data from the transmitter terminal toward the destination terminal;

receiving a response signal for the packet data transmitted at the transmitter terminal;

transmitting a control signal including information for the transmitter terminal and the destination terminal and information for the packet data depending on presence or absence and type of the response signal;

retransmitting the packet data which was sent after sending the control signal;

sending a response signal for the sent packet data toward the transmitter terminal from the destination terminal;

receiving the packet data at one of the plurality of repeater terminals and subsequently sending the packet data to one or more of the plurality of repeater terminals;

receiving the response signal at one of the plurality of repeater terminals and subsequently sending the response signal to the transmitter terminal or one or more of the plurality of repeater terminals;

determining a contribution of each respective repeater terminal numerically based on a number of repeating times of the packet data and number of repeating times of the response signal;

entering the respective repeater terminal into a repeating mode for continuously sending the packet data when the determining means determines that the contribution is high, or a numeric value for the contribution reaches a predetermined threshold or higher; and entering the respective repeater terminal into a sleep mode for repeating no packet data when the determining means determines that the contribution is low, or the numeric value for the contribution does not reach the predetermined threshold or higher.

* * * * *